US011544470B2

(12) United States Patent
Zhang et al.

(10) Patent No.: US 11,544,470 B2
(45) Date of Patent: Jan. 3, 2023

(54) EFFICIENT DETERMINATION OF USER INTENT FOR NATURAL LANGUAGE EXPRESSIONS BASED ON MACHINE LEARNING

(71) Applicant: salesforce.com, inc., San Francisco, CA (US)

(72) Inventors: Jianguo Zhang, Sunnyvale, CA (US); Kazuma Hashimoto, Menlo Park, CA (US); Chien-Sheng Wu, Mountain View, CA (US); Wenhao Liu, Redwood City, CA (US); Richard Socher, Menlo Park, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 82 days.

(21) Appl. No.: 17/005,316

(22) Filed: Aug. 28, 2020

(65) Prior Publication Data
US 2021/0374353 A1 Dec. 2, 2021

Related U.S. Application Data

(60) Provisional application No. 63/033,001, filed on Jun. 1, 2020.

(51) Int. Cl.
*G06F 17/00* (2019.01)
*G06F 40/30* (2020.01)
*G10L 15/16* (2006.01)

(52) U.S. Cl.
CPC .............. *G06F 40/30* (2020.01); *G10L 15/16* (2013.01)

(58) Field of Classification Search
None
See application file for complete search history.

(56) References Cited

U.S. PATENT DOCUMENTS

| 9,633,317 B2 * | 4/2017 | Gabel ................... G06N 5/022 |
| 10,891,435 B1 * | 1/2021 | Ruiz ..................... G06F 40/30 |

(Continued)

OTHER PUBLICATIONS

Asai, A. et al., "Learning to Retrieve Reasoning Paths over Wikipedia Graph for Question Answering," ICLR 2020, Sep. 25, 2019, pp. 1-14.

(Continued)

*Primary Examiner* — Satwant K Singh
(74) *Attorney, Agent, or Firm* — Fenwick & West LLP

(57) ABSTRACT

An online system allows user interactions using natural language expressions. The online system uses a machine learning based model to infer an intent represented by a user expression. The machine learning based model takes as input a user expression and an example expression to compute a score indicating whether the user expression matches the example expression. Based on the scores, the intent inference module determines a most applicable intent for the expression. The online system determines a confidence threshold such that user expressions indicating a high confidence are assigned the most applicable intent and user expressions indicating a low confidence are assigned an out-of-scope intent. The online system encodes the example expressions using the machine learning based model. The online system may compare an encoded user expression with encoded example expressions to identify a subset of example expressions used to determine the most applicable intent.

20 Claims, 8 Drawing Sheets

(56) References Cited

U.S. PATENT DOCUMENTS

| | | | | |
|---|---|---|---|---|
| 2019/0034429 | A1* | 1/2019 | Das | G06N 5/04 |
| 2020/0274969 | A1* | 8/2020 | Dunn | H04M 3/4933 |
| 2020/0357409 | A1* | 11/2020 | Sun | G10L 15/26 |
| 2021/0142103 | A1* | 5/2021 | Xie | G06N 5/046 |
| 2021/0357747 | A1* | 11/2021 | Mukherjee | G06N 3/0454 |
| 2022/0060580 | A1* | 2/2022 | Dunn | H04M 3/4938 |

OTHER PUBLICATIONS

Bowman, S.R. et al., "A large annotated corpus for learning natural language inference," arXiv:1508.05326v1, Aug. 21, 2015, pp. 1-11.

Bowman, S.R. et al., "Deep learning for natural language inference," 2019 Conference of the North American Chapter of the Association for Computational Linguistics, Jun. 2019, pp. 6-8.

Casanueva, I. et al., "Efficient Intent Detection with Dual Sentence Encoders," arXiv:2003.04807v1, Mar. 10, 2020, pp. 1-8.

Chambers, N. et al., "Improving the Use of Pseudo-Words for Evaluating Selectional Preferences," Proceedings of the 48th Annual Meeting of the Association for Computational Linguistics, Jul. 2010, pp. 445-453.

Chatterjee, R. et al., "Findings of the WMT 2019 Shared Task on Automatic Post-Editing," Proceedings of the Fourth Conference on Machine Translation, vol. 3: Shared Task Papers, Day 2, Aug. 2019, pp. 11-28.

Chen, D. et al., "Reading Wikipedia to Answer Open-Domain Questions," Proceedings of the 55th Annual Meeting of the Association for Computational Linguistics, vol. 1, Aug. 2017, pp. 1870-1879.

Conneau, A. et al., "XNLI: Evaluating Cross-lingual Sentence Representations," Proceedings of the 2018 Conference on Empirical Methods in Natural Language Processing, Nov. 2018, pp. 2475-2485.

Cunningham, P. et al., "k-Nearest Neighbour Classifiers," Technical Report UCD-CSI-2007-04, School of Computer Science & Informatics, University College Dublin, Mar. 27, 2007, pp. 1-17.

Deng, S. et al., "When low resource nlp meets unsupervised language model: Metapretraining then meta-learning for few-shot text classification," arXiv:1908.08788v2, Nov. 21, 2019, pp. 1-3.

Devlin, J. et al., "BERT: Pre-training of Deep Bidirectional Transformers for Language Understanding," Proceedings of the 2019 Conference of the North American Chapter of the Association for Computational Linguistics: Human Language Technologies, vol. 1 (Long and Short Papers), Oct. 2018, pp. 4171-4186.

Devries, T. et al., "Learning Confidence for Out-of-Distribution Detection in Neural Networks," arXiv:1802.04865, Feb. 13, 2018, pp. 1-12.

Eriguchi, A. et al., "Zero-Shot Cross-lingual Classification Using Multilingual Neural Machine Translation," arXiv: 1809.04686, Sep. 12, 2018, pp. 1-8.

Fei-Fei, L. et al., "Oneshot learning of object categories," IEEE Transactions on Pattern Analysis and Machine Intelligence, vol. 28, Iss. 4, Feb. 21, 2006, pp. 594-611.

Finn, C. et al., "Model-Agnostic Meta-Learning for Fast Adaptation of Deep Networks," Proceedings of the 34th International Conference on Machine Learning, vol. 70, Aug. 2017, pp. 1126-1135.

Ganitkevitch, J. et al., "PPDB: The Paraphrase Database," Proceedings of NAACL-HLT, Jun. 2013, pp. 758-764.

Geng, R. et al., "Induction networks for few-shot text classification," Proceedings of the 2019 Conference on Empirical Methods in Natural Language Processing and the 9th International Joint Conference on Natural Language Processing, Nov. 2019, pp. 3904-3913.

Hashimoto, K. et al., "A Joint Many-Task Model: Growing a Neural Network for Multiple NLP Tasks," Proceedings of the 2017 Conference on Empirical Methods in Natural Language Processing, Sep. 2017, pp. 1923-1933.

Hendrycks, D. et al., "A Baseline for Detecting Misclassified and Out-of-Distribution Examples in Neural Networks," ICLR 2017, Oct. 2016, pp. 1-13.

Hendrycks, D. et al., "Pretrained Transformers Improve Out-of-Distribution Robustness," arXiv:2004.06100, Apr. 16, 2020, pp. 1-11.

Jiang, Y. et al., "Explore, Propose, and Assemble: An interpretable Model for Multi-Hop Reading Comprehension," Proceedings of the 57th Annual Meeting of the Association for Computational Linguistics, Aug. 2019, pp. 2714-2725.

Johnson, J. et al., "Billion-scale similarity search with GPUs," arXiv:1702.08734, Feb. 28, 2017, pp. 1-12.

Larson, S. et al., "An Evaluation Dataset for Intent Classification and Out-of-Scope Prediction," Proceedings of the 2019 Conference on Empirical Methods in Natural Language Processing and the 9th International Joint Conference on Natural Language Processing, Nov. 2019, pp. 1311-1316.

Lee, K. et al., "Latent Retrieval for Weakly Supervised Open Domain Question Answering," Proceedings of the 57th Annual Meeting of the Association for Computational Linguistics, Aug. 2019, pp. 6086-6096.

Levesque, H.J. et al., "The Winograd Schema Challenge," Proceedings of the Thirteenth International Conference on Principles of Knowledge Representation and Reasoning, Jun. 2012, pp. 552-561.

Liu, Y. et al., "RoBERTa: A Robustly Optimized BERT Pretraining Approach," arXiv:1907.11692, Jul. 26, 2019, pp. 1-13.

Loshchilov, I. et al., "Fixing Weight Decay Regularization in Adam," arXiv:1711.05101, Nov. 14, 2017, pp. 1-13.

Luo, B. et al., "Marrying up Regular Expressions with Neural Networks: A Case Study for Spoken Language Understanding," Proceedings of the 56th Annual Meeting of the Association for Computational Linguistics (Long Papers), Jul. 2018, pp. 2083-2093.

Marelli, M. et al., "SemEval-2014 Task 1: Evaluation of Compositional Distributional Semantic Models on Full Sentences through Semantic Relatedness and Textual Entailment," Proceedings of the 8th International Workshop on Semantic Evaluation (SemEval 2014), Aug. 2014, pp. 1-8.

Muller, R. et al., "When Does Label Smoothing Help?," 33rd Conference on Neural Information Processing Systems (NeurIPS 2019), Dec. 2019, pp. 1-10.

Negri, M. et al., "eSCAPE: a Large-scale Synthetic Corpus for Automatic Post-Editing," Proceedings of the Eleventh International Conference on Language Resources and Evaluation (LREC 2018), May 2018, pp. 24-30.

Nie, Y. et al., "Revealing the Importance of Semantic Retrieval for Machine Reading at Scale," Proceedings of the 2019 Conference on Empirical Methods in Natural Language Processing and the 9th International Joint Conference on Natural Language Processing, Nov. 2019, pp. 2553-2566.

Pascanu, R. et al., "On the difficulty of training recurrent neural networks," Proceedings of the 30th International Conference on Machine Learning, Jun. 2013, pp. 1310-1318.

Rastogi, A. et al., "Towards Scalable Multi-domain Conversational Agents: The Schema-Guided Dialogue Dataset," arXiv:1909.05855, Sep. 12, 2019, pp. 1-11.

Reimers, N. et al., "Sentence-BERT: Sentence Embeddings using Siamese BERT-Networks," Proceedings of the 2019 Conference on Empirical Methods in Natural Language Processing and the 9th International Joint Conference on Natural Language Processing, Nov. 2019, pp. 3982-3992.

Sanh, V. et al., "DistilBERT, a distilled version of BERT: smaller, faster, cheaper and lighter," arXiv:1910.01108, Oct. 2019, pp. 1-5.

Seo, M. et al., "Real-Time Open-Domain Question Answering with Dense-Sparse Phrase Index," Proceedings of the 57th Annual Meeting of the Association for Computational Linguistics, Aug. 2019, pp. 4430-4441.

Shleifer, S. et al., "Low Resource Text Classification with ULMFit and Backtranslation," arXiv:1903.09244, Mar. 25, 2019, pp. 1-9.

Simard, P. et al., "Efficient Pattern Recognition Using a New Transformation Distance," Advances in Neural Information Processing Systems 5, Nov. 1992, pp. 50-58.

Snell, J. et al., "Prototypical Networks for Few-shot Learning," 31st Conference on Neural Information Processing Systems (NIPS 2017), Dec. 2017, pp. 1-11.

Sun, S. et al., "Hierarchical Attention Prototypical Networks for Few-Shot Text Classification," Proceedings of the 2019 Conference

(56) References Cited

OTHER PUBLICATIONS on Empirical Methods in Natural Language Processing and the 9th International Joint Conference on Natural Language Processing, Nov. 2019, pp. 476-485.

Sung, F. et al., "Learning to Compare: Relation Network for Few-Shot Learning," Proceedings of the IEEE Conference on Computer Vision and Pattern Recognition, Jun. 2018, pp. 1199-1208.

Sydorova, A. et al., "Interpretable Question Answering on Knowledge Bases and Text," Proceedings of the 57th Annual Meeting of the Association for Computational Linguistics, Aug. 2019, pp. 4943-4951.

Szegedy, C. et al., "Rethinking the Inception Architecture for Computer Vision," Proceedings of the IEEE Conference on Computer Vision and Pattern Recognition, 2016, Jul. 2016, pp. 2818-2826.

Vaswani, A. et al., "Attention is All you Need," 31st Conference on Neural Information Processing Systems (NIPS 2017), Dec. 2017, pp. 1-11.

Vinyals, O. et al., "Matching Networks for One Shot Learning," 30th Conference on Neural Information Processing Systems (NIPS 2016), Dec. 2016, pp. 1-9.

Wang, A. et al., "GLUE: A Multi-Task Benchmark and Analysis Platform for Natural Language Understanding," Proceedings of the 2018 EMNLP Workshop BlackboxNLP: Analyzing and Interpreting Neural Networks for NLP, Nov. 2018, pp. 353-355.

Watanabe, Y. et al., "Question Answering from Unstructured Text by Retrieval and Comprehension," arXiv:1703.08885, Mar. 26, 2017, pp. 1-9.

Wei, J. et al., "EDA: Easy Data Augmentation Techniques for Boosting Performance on Text Classification Tasks," Proceedings of the 2019 Conference on Empirical Methods in Natural Language Processing and the 9th International Joint Conference on Natural Language Processing, Nov. 2019, pp. 6382-6388.

Wieting, J. et al., "ParaNMT-50M: Pushing the Limits of Paraphrastic Sentence Embeddings with Millions of Machine Translations," Proceedings of the 56th Annual Meeting of the Association for Computational Linguistics (Long Papers), Jul. 2018, pp. 451-462.

Williams, A. et al., "A Broad-Coverage Challenge Corpus for Sentence Understanding through Inference," Proceedings of NAACL-HLT 2018, Jun. 2018, pp. 1112-1122.

Xu, H. et al., "Open-world learning and application to product classification," WWW '19, May 2019, pp. 1-7.

Yu, A. et al., "QANet: Combining Local Convolution with Global Self-Attention for Reading Comprehension," ICLR 2018, Apr. 2018, pp. 1-16.

* cited by examiner

EFFICIENT DETERMINATION OF USER INTENT FOR NATURAL LANGUAGE EXPRESSIONS BASED ON MACHINE LEARNING

CROSS REFERENCE TO RELATED APPLICATIONS

This application claims the benefit of U.S. Provisional Application No. 63/033,001, filed Jun. 1, 2020, which is incorporated by reference in its entirety.

FIELD OF ART

The concepts described herein relate to the field of machine learning, and more specifically, to the use of machine learning models such as artificial neural networks for efficient prediction of intents of natural language expressions, for example, in a chatbot conversation.

BACKGROUND

Natural language is an expressive and highly intuitive medium for users when interacting with electronic systems, freeing users from the need to learn complex user interfaces, to navigate multiple screens of data, and the like. However, the very expressivity and open nature of natural language poses a challenge to the electronic systems, which are then tasked with determining the meaning of the users' natural language expressions.

Some electronic systems allow users to interact with them using natural language expressions (e.g., via voice or textual input) such as queries or commands, responding with actions appropriate for the users' expressions. Such systems are referred to as chatbots, conversational assistants, artificial intelligence (AI) assistants, intelligent virtual assistants, or virtual agents. Artificial intelligence based chatbots receive user utterances that may be provided as voice signals that are analyzed using automated speech recognition techniques.

A chatbot may analyze user utterances using artificial intelligence techniques including machine learning based models, for example, artificial neural networks such as convolutional neural networks, recurrent neural networks, or multi-layer perceptrons. These techniques help the chatbot determine an intent of a user utterance. Traditional machine learning based models for analyzing natural language sentences typically requires large amount of labeled training data, and the process of labeling by human experts is costly in terms of both time and money. Lack of large amount of training data results in machine learning models that have poor quality of prediction.

Figure 1:
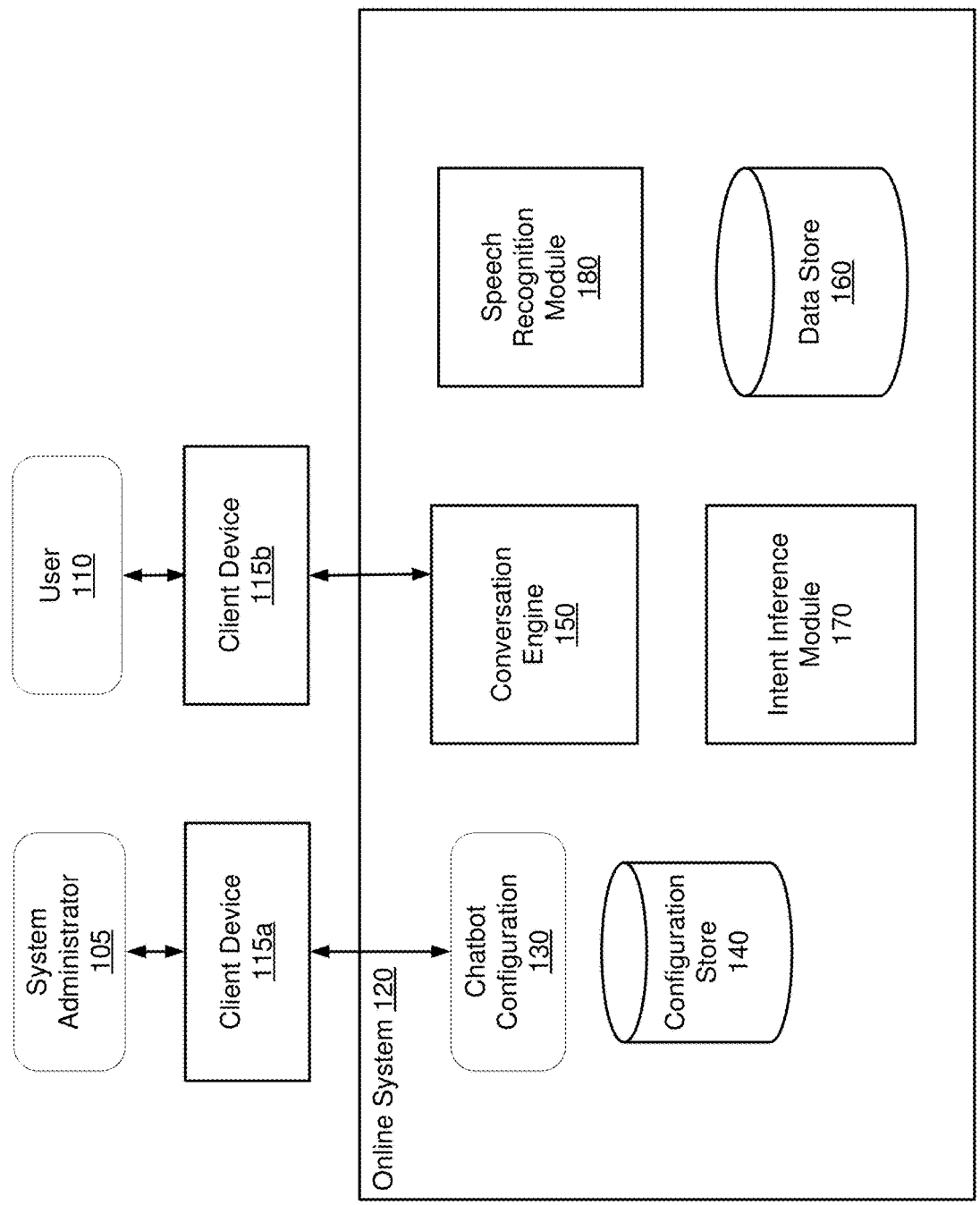
FIG. 1 is a block diagram of a system environment for performing actions according to requests made by users through natural language interactions with an online system, according to one embodiment.

The figures depict embodiments for purposes of illustration only. One skilled in the art will readily recognize from the following description that alternative embodiments of the structures and methods illustrated herein may be employed without departing from the principles described herein.

DETAILED DESCRIPTION

Embodiments allow users of an online system to interact with the system using natural language expressions—free-form, natural language linguistic input, such as requests, queries, or commands. For example, a user may use a chatbot for performing a natural language conversation with an online system. The online system is configured to perform a set of tasks based on conversations with the users. The online system receives a user utterance and determines the intent of the user utterance. The intent of a user utterance corresponds to a task that the user wants to perform using the online system. For example, the user may request some information stored in a record of the online system, the user may want to update some information, or request any other information. Traditionally, determining an intent of a user utterance requires an accurate model for predicting user intent, which requires relatively large amounts of labeled training data. Labeling such training data can be costly, in terms both of required time and monetary expense.

In order to minimize the need for such training data, the online system according to an embodiment obtains a very small amount of labeled training data and uses natural language inference to reliably determine a user's intent via comparison of the user's natural language input with examples that have previously determined intents.

More specifically, the online system stores a set of possible intents, and for each intent, a small number (e.g., 5-10) of example natural language expressions that correspond to that intent. To determine the intent of a given user natural language expression, the online system matches the expression with stored examples using a natural language inference (NLI) model to identify matching examples. The online system provides the expression and each stored example expression to the NLI model, which outputs a score indicating a degree of match between the expression and a stored example. In an embodiment the score indicates a likelihood that the user expression semantically entails the stored example expression. If the scores indicate sufficient confidence, the online system selects the intent with the best scores (e.g., the intent having the highest score) as representing the user expression. If the scores are below a confidence threshold, indicating low confidence in the score, the online system determines that the intent represents an out-of-scope intent value.

Based on the determined intent, the online system (e.g., its AI assistant) may take an action in response to the user's natural language expression. In some embodiments, the online system also performs other actions, such as using the determined intent as a soft intent label for the user expression, to be used to enlarge a training set for directly training an intent model without requiring costly human labeling of expressions with corresponding intents.

System Environment

FIG. 1 is a block diagram of a system environment 100 for performing actions according to requests made by users through natural language interactions with the online system, according to one embodiment. The system environment 100 includes an online system 120 that communicates with users via the users' client devices 115. Some users are privileged users, such as system administrators, who are allowed to perform specific actions that other users cannot. In some embodiments, the online system 120 includes a configuration store 140, a conversation engine 150, an intent inference module 170, a speech recognition module 180, and a data store 160. The online system 120 may include other components not shown in FIG. 1, such as various applications, other types of data stores, and so on. The system environment 100 may include other elements not shown in FIG. 1, such as a network interconnecting the various components such as the online system 120 and the client devices 115.

In an embodiment, the conversation engine 150 uses chatbots to perform conversations with users 110. The online system 110 allows system administrators 150 to customize the chatbots using a chatbot configuration 130. The configurations of chatbots are stored in the configuration store 140. As shown in FIG. 1, a system administrator 105 may use a client device 115a to provide the chatbot configuration 130 to the online system 120. The chatbot configuration configures and customizes the chatbots used by the conversation engine 150. A chatbot may be customized to allow users to perform a specific set of tasks. A task may also be referred to as a permitted action. An enterprise that performs certain types of transactions may customize the chatbot to allow users to have conversations with the online system 120 to perform tasks related to the transactions, for example, perform authentication, execute a transaction, check status of a transaction, and so on.

A user 110 can perform natural language conversations with the online system 120 to perform certain tasks. The conversation engine 150 stores the instructions that allow the online system 120 to perform natural language conversations with users 110. The conversation engine 150 receives a user utterance from a user. The user utterance includes a natural language expression. The conversation engine 150 determines the intent of the user requested via the natural language expression. The conversation engine 150 invokes the intent inference module 170 to determine the intent of the natural language expression. The intent inference module 170 that employs natural language inference (NLI) techniques to allow reliable determination of a user's intent when the user provides an utterance representing a natural language expression.

The online system 120 can use the intents determined by the intent inference module 170 for natural language expressions for various purposes. For example, an online system with a conversation engine 150 can use the intents determined by the NLI module 205 to guide a conversation with a user. For example, if the user specifies (e.g., by voice, or by text in a query or chat session, or the like) the natural language expression "Change my email address for me", the intent inference module 170 can determine that the intent to change the user's email address on the online system 120 is the most applicable intent, and the conversation engine 150 can accordingly take a next step in the conversation, such as prompting the user for a new email address to substitute for the existing one, presenting a user interface showing the current email address and allowing the user to enter a new email address, or the like.

Figure 2:
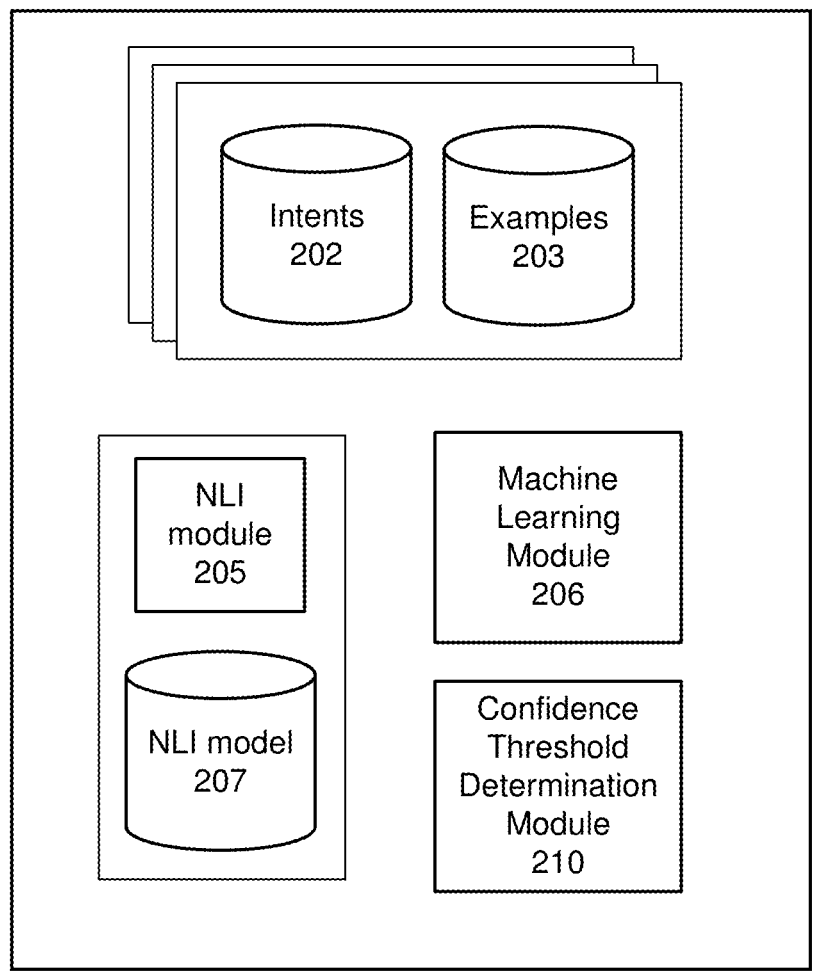
FIG. 2 is a high-level block diagram illustrating a detailed view of the intent inference module of FIG. 1, according to one embodiment.

In an embodiment, the intent inference module 170 uses a machine learning-based model, such as a neural network, to determine a permitted action 130 corresponding to a natural language expression. Details of the intent inference module 170 are illustrated in FIG. 2 and described in connection with FIG. 2. The intent of the natural language expression corresponds to a task that the user wants to perform. The conversation engine 150 determines whether additional information is needed to perform the task and performs further conversation with the user to receive the additional information. After collecting the required information, the online system performs the requested task.

In some embodiments, the online system 120 permits users 110 to interact with the online system 120 via voice. The speech recognition module 180 receives an audio signal as input and converts it into a computer-readable format (such as text) for further processing. The output of the speech recognition module 180 is provided as input to other modules of the online system 150 that analyze natural language represented in the computer-readable form (e.g., textual form).

The online system 120 stores data in data store 160 that may be processed by a permitted action. For example, a task may update data stored in data store 160, search for data stored in data store 160, and so on. The data store 160 stores data for users of the online system. The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc. In other embodiments, the data store is implemented in unstructured format, such as with a NoSQL database.

In some embodiments, the online system 120 stores data of multiple tenants to form a multi-tenant system. Each tenant may be an enterprise. For example, a tenant may be a company that employs sales people that use the online system 120 to manage their sales processes. A multi-tenant system may store data for multiple tenants in the same physical database but enforce a logical separation of data across tenants. As a result, one tenant does not have access to another tenant's data unless such data is expressly shared.

In some such embodiments, each tenant is able to define its own metadata. For example, two tenants may define different sets of tasks that a user is allowed to perform. Accordingly, the conversation engine 150 may map a natural language expression from a user to different permitted actions for two different tenants. Furthermore, two tenants may store their data using different underlying data schemas.

Accordingly, the same permitted action may execute different sets of instructions for two different tenants. Some embodiments use the same trained machine learning-based model across different tenants. Accordingly, the machine learning based model is not trained separately for each tenant but is trained once and executed across different tenants.

In an embodiment, online system 120 implements a web-based customer relationship management (CRM) system. For example, the online system 100 may include application servers configured to implement and execute CRM software applications as well as provide related data, code, forms, webpages and other information to and from client devices 110 and to store to, and retrieve from, a database system-related data, objects, and webpage content.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), interne control message protocol (ICMP), etc. The data exchanged over the network 110 can be represented using technologies and/or formats including the hypertext markup language (HTML), the extensible markup language (XML), etc.

System Architecture

FIG. 2 is a high-level block diagram illustrating a detailed view of the intent inference module 170 of FIG. 1, according to one embodiment.

The intent inference module 170 stores a set of intents 202 that represent the various possible actions that a user could intend by a given natural language expression. For instance, some example intents might express the user's desire to change the user's email address, to change the user's physical mailing address, to begin composition of an electronic message, or the like. The intents 202 can be represented in any manner (e.g., as an integer or string), as long as each intent's representation is distinct from the others.

The intent inference module 170 additionally stores, for each intent 202, a set of example natural language expressions. The examples 203 for an intent 202 are representative expressions in natural language form that are known to indicate that intent on the part of a user who uses those expressions. The examples may be stored in any suitable form, such as text (e.g., in YAML files). In order to avoid the expense of being obliged to generate or otherwise obtain large amounts of sample data (e.g., thousands or tens of thousands of examples), there need be only a small number of examples 203 for each intent, with natural language inference leveraged as described later to obtain reliability without the benefit of many examples. For example, in some embodiments the intent inference module 170 stores only approximately 5 examples for each intent, an amount of examples that is easily feasible for a data scientist or other knowledgeable user to provide directly. For instance, the examples for the intent expressing the desire to change the user's email address might be {"I want to update my email address", "I need to change my email address", "Update email address", "Please change my email address", "Update my email"}. In some embodiments, all instances 202 have the same number of corresponding examples 203 (e.g., 5 examples); in other embodiments, there number of examples may differ between different intents.

In embodiments in which the online system 120 stores the data of multiple tenants, each tenant may have its own set of intents 202 and examples 203 that are specific to it, thus allowing natural language understanding that is tailored for the domain in which the tenant is operating.

The intent inference module 170 includes an NLI module 205 that determines which of the various possible intents 202, if any, is most applicable for a given natural language expression of a user. To do so, the NLI module 205 uses an NLI model 207 that determines, for a given first natural language expression and a given second natural language expression, a score indicating a likelihood that the first natural language expression textually entails the second natural language expression. (A first natural language expression is said to textually entail a second natural language expression—or, equivalently, the second natural language expression is said to be inferable from the first natural language expression—if a human reading the first expression would consider that the second expression is most likely true. For example, the expression "I would like to change my email address" textually entails the expression "Change user information", because a human would likely conclude that the second expression is indeed being requested in light of the first expression.)

Given a user expression, the NLI module 205 scores the examples of the various known <intent, example> pairs from the stored intents 202 and examples 203 in order to determine which intent is most applicable to the user expression. That is, for each intent $N_i$ 202 (or some subset thereof), and for each example $E_j$ (or some subset thereof), and for a user expression Q, the NLI module 205 provides Q and $E_j$ as input to the NLI model 207 to obtain a score indicating a likelihood that Q textually entails $E_j$.

The most applicable intent $N_i$ is determined based on the various scores produced for the various <Q, $E_j$> pairs. In one embodiment, the NLI module 205 identifies the example $E_j$ that is most strongly textually entailed by Q (that is, the $E_j$ corresponding to the greatest of the textual entailment scores) and assigns its score to its corresponding intent Ni, and if its score is above a given threshold indicating a sufficient level of confidence, then the NLI module determines that the intent $N_i$ corresponding to the example $E_j$ is representative of the expression Q. In other embodiments, the NLI module 205 computes an aggregate score for a given intent $N_i$ based on the scores for the <Q, $E_j$> pairs for all the examples $E_j$ corresponding to that intent, and selects the intent with the highest score, provided that that score is over a given confidence threshold. In some such embodiments, the aggregate score for an intent is an arithmetic average for all the examples for the intent.

In some embodiments, the NLI module 205 associates only the most applicable intent (i.e., the intent with the highest entailment score) with the user expression. In other embodiments, the NLI module 205 may associate multiple intents with the user expression, such as up to some predetermined number of top intents with scores of at least some threshold level.

In some embodiments, the intent inference module 170 includes a machine learning module 206 that trains the NLI model 207 used by the NLI module 205. The input to the training is a set of ordered natural language expression pairs, along with a label for each pair indicting whether the first expression of the pair does or does not textually entail the second expression of the pair. Such pairs and corresponding labels may be obtained from corpuses such as SNLI, MNLI, or WNLI, with the appropriate preprocessing (e.g., converting corpus labels indicating entailment to a binary "true" value and labels indicating contradiction, or neither entailment nor contraction, to binary "false" values). Techniques such as BERT (Bidirectional Encoder Representations from Transformers) may be used to train the NLI model 207 given the input pairs and labels.

In an embodiment, the intent inference module 170 treats the examples as classes such that all examples corresponding to an intent belong to the same intent class. The intent inference module 170 trains the NLI model 207 as a binary classifier such that if the NLI model 207 receives a user expression U and an example E as input, the NLI model 207 outputs a score value close to 1.0 if U belongs to the same class as E and otherwise the NLI model 207 generates a score close to 0.0. The intent inference module 170 creates positive training data using all possible ordered pairs within the same intent class. Accordingly, the intent inference module 170 has $N*K*(K-1)$ positive examples, where N is the number of intent classes and K is the number of examples per intent class. For negative examples, the intent inference module 170 uses all possible ordered pairs across any two different intent classes. Accordingly, the intent inference module 170 has $K^2*N*(N-1)$ negative examples which is greater than the number of positive examples. The intent inference module 170 trains the NLI model 207 by a binary cross-entropy loss function.

In some such embodiments, the machine learning module 206 also trains other types of models. For example, the intent inference module 170 may use the machine learning module 206 to train an intent classification model that directly predicts the user's intent for a given natural language expression. Specifically, the intents determined to apply to a given natural language expression using the NLI module 205 as described above are treated as "soft" labels for the expression. The set of all such expressions with intent labels produced by the NLI module 205 then serves as input to the machine learning module 206, which uses a supervised learning algorithm to generate an intent classification model that directly predicts user intent.

Processes

Figure 3:
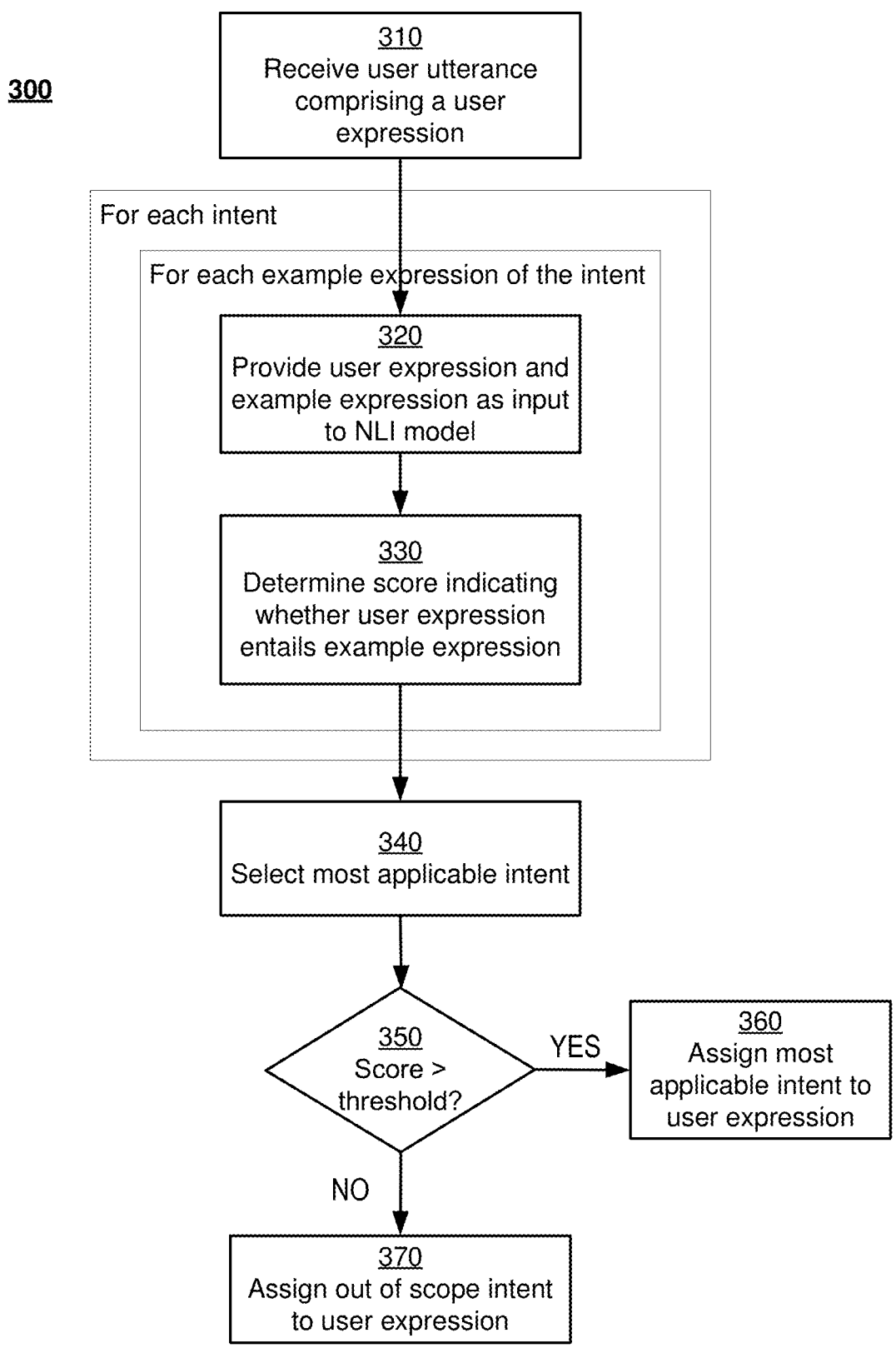
FIG. 3 is a flowchart illustrating the process executed for determining an intent for a natural language expression, according to some embodiments.

FIG. 3 is a flowchart illustrating the process 300 executed by an NLI module for determining an intent for a natural language expression, according to some embodiments. The conversation engine 150 receives 310 a user utterance comprising a natural language user expression. The intent inference module 170 performs steps 320 and 330 for each intent and for each stored example expression for that intent. The intent inference module 170 provides 320 the user expression and the stored example expression as input to the NLI model 207 to find matching example expressions for an user expression. The NI model 207 determines the score indicating whether the user expression matches a stored example expression. In an embodiment, the determines the score indicating whether the user expression entails the input stored example expression.

Based on the scores determined for each intent and for each stored example expression for the intent, the intent inference module 170 selects 340 the most applicable intent. For example, the intent inference module 170 may select 340 the most applicable intent as the intent corresponding to the stored example expression that has the highest score. Alternatively, the intent inference module 170 computes, for each intent, an aggregate score based on the scores of the example expressions for the intent and selects the intent having the highest aggregate score.

The intent inference module 170 compares 350 the score of the selected most applicable intent to a confidence threshold. If the score of the selected most applicable intent is below the confidence threshold indicating a low confidence based on the comparison, the intent inference module 170 assigns 370 an out-of-scope intent value to the user expression. The out-of-scope intent is distinct from the plurality of stored possible intents that were provided by the user, for example, a system administrator as part of the chatbot configuration. If the score of the selected most applicable intent is above the confidence threshold indicating a high confidence based on the comparison, the intent inference module 170 assigns 360 the user expression the most applicable intent.

Efficient Intent Determination

In an embodiment, the NLI model 207 generates an encoded version of an input expression. The encoded version is used by the NLI model 207 for predicting the user intent. For example, the NLI model 207 may be a neural network that has an input layer, one or more hidden layers, and an output layer. The input layer receives the input of the neural network. The input layer provides values used as input by a hidden layer. If there are multiple hidden layers, the hidden layer may provide values used as input by another hidden layer. The last hidden layer provides the values used by the output layer, which in turn generates the output of the neural network. The encoded example expression corresponds to an output of a hidden layer of the neural network, for example, the output of the last hidden layer that provides the values used by the output layer of the neural network. The neural network also generates an encoded version of the user expression that is input to the neural network. In an embodiment, the encoded version of an example is a vector of values. The intent inference module 170 uses the encoded versions of examples to filter the examples into a smaller set of examples by simple comparison of encoded examples with encoded user expressions. This allows the intent inference module 170 to determine the intent of a user expression efficiently since the neural network is executed for comparing the user expression with fewer example expressions, i.e., the subset of example expressions.

Figure 4:
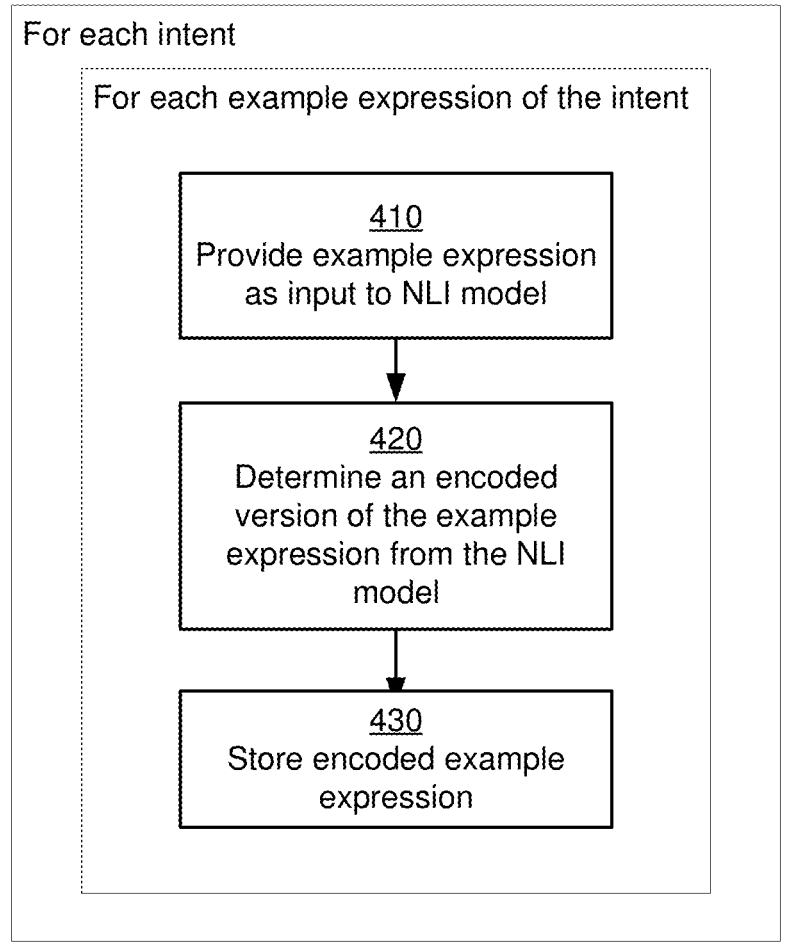
FIG. 4 is a flowchart illustrating the process for encoding examples associated with intents, according to some embodiments.

FIG. 4 is a flowchart illustrating the process for encoding examples associated with intents, according to some embodiments. The intent inference module 170 performs steps 410, 420, and 430 for each possible intent and for each example expression of the possible intent. The intent inference module 170 provides 410 the example expression as input to the NLI model 207. The intent inference module 170 determines 420 an encoded version of the example expression based on the NLI model 207. For example, the NLI model 207 may be a neural network and the encoded version of the example expression represents the output of a hidden layer of the neural network. The intent inference module 170 stores 430 the encoded example expressions.

Figure 5:
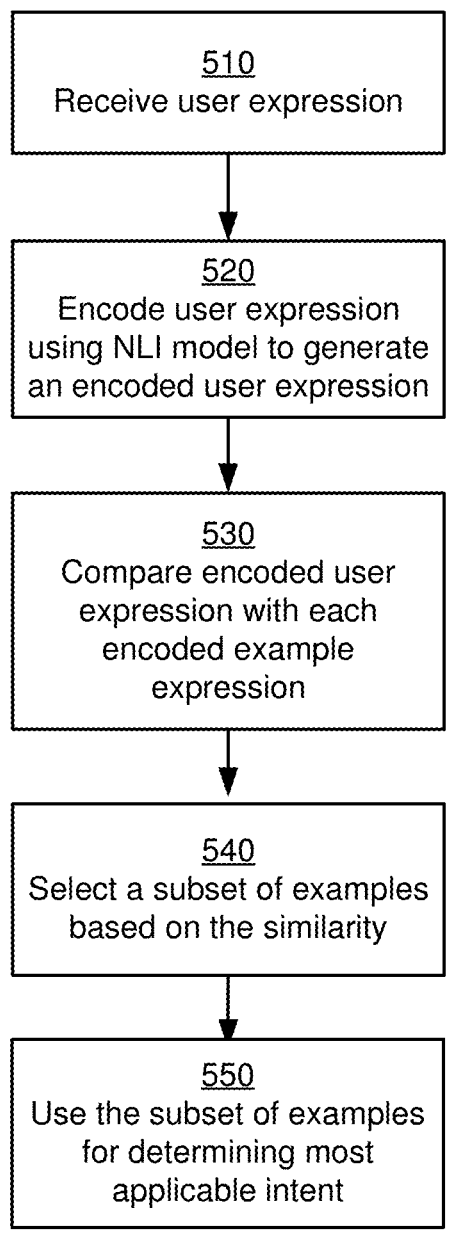
FIG. 5 is a flowchart illustrating the process for efficiently determining intent of user expressions based on encoded examples associated with intents, according to some embodiments.

FIG. 5 is a flowchart illustrating the process for efficiently determining intent of user expressions based on encoded examples associated with intents, according to some embodiments. The intent inference module 170 receives 510 a user expression. The intent inference module 170 encodes 520 the user expression using the NLI model 207 to generate an encoded user expression.

The intent inference module 170 compares 530 the encoded user expression with each encoded example expression. In an embodiment, the intent inference module 170 compares 530 the encoded user expression with an encoded example expression using cosine similarity. Cosine similarity is a measure of similarity between two vectors of a space and is defined to equal the cosine of the angle between the two vectors. The cosine similarity between two vectors represents the inner product of the two vectors normalized to both have unit length.

The intent inference module 170 selects 540 a subset of example expressions based on the similarity. For example, the intent inference module 170 may rank the example expressions in decreasing order of the measure of similarity between the encoded example expression and the encoded user expression and select a subset representing the top example expressions. The intent inference module 170 uses 550 the subset of examples to determine the most applicable intent. Accordingly, the intent inference module 170 performs the steps of the process illustrated in FIG. 3 and 330 that provide 320 the user expression and example expression as input to the NLI model 207 and determine 330 the score indicating whether the user expression entails the example expression for the subset of example expressions.

Determining Confidence Threshold

The confidence threshold value used by the processes described herein significantly affects the quality of results obtained by the processes. Following is a description according to some embodiments of a process used for determining a confidence threshold.

Figure 6:
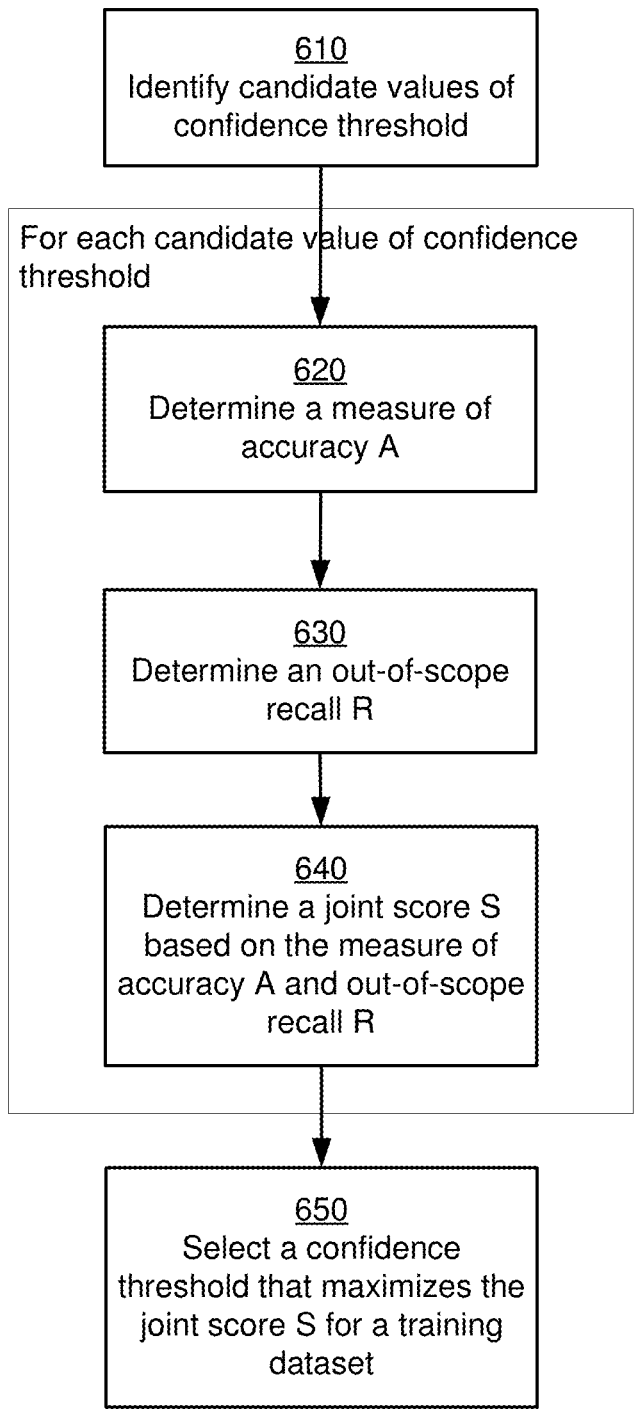
FIG. 6 is a flowchart illustrating the process for determining confidence threshold, according to some embodiments.

FIG. 6 is a flowchart illustrating the process for determining confidence threshold, according to some embodiments. The intent inference module 170 identifies 610 a set of candidate values for confidence threshold. For example, the set of candidate threshold values may be [0.0, 0.1, 0.2, 0.3, ..., 0.9, 1.0]. The intent inference module 170 performs the following steps 620, 630, and 640 for each candidate threshold value.

The intent inference module 170 determines a measure of accuracy A for the candidate value of confidence threshold. The measure of accuracy represents a fraction of examples that are accurately predicted by the model to have an intent from the plurality of stored possible intents. For example, if $C_{in}$ is the number of correctly predicted in-domain intent examples, and $N_{in}$ is the total number of the examples evaluated, the measure of accuracy A is the ratio $C_{in}/N_{in}$. The in-domain intent refers to an intent value from the plurality of stored possible intents.

The intent inference module 170 determines an out-of-scope recall value R for the candidate value of confidence threshold. The out-of-scope recall represents a fraction of known out-of-scope examples that are predicted to be out-of-scope by the NLI model. For example, the recall R is the ratio $C_{oos}/N_{oos}$, where $C_{oos}$ is the number of examples for the NLI model correctly predicted the result to be out-of-scope value out of a total number $N_{oos}$ of examples that were evaluated and known to be out-of-scope.

The intent inference module 170 determines 640 a joint score for the candidate value of confidence threshold by combining the measure of accuracy and the out-of-scope recall value. For example, the joint score is determined as the sum (A+R). The intent inference module 170 selects 650 the candidate value for confidence threshold that maximizes the joint score value for a training dataset. The confidence threshold value selected by the process illustrated in FIG. 6 results in better prediction of intent than an arbitrarily selected value, for example, a fixed value 0.5 that may be configured by a system administrator.

In an embodiment, the online system also determines a precision value for reporting. The precision value is determined as the ratio $C_{oos}/N'_{oos}$ where $C_{oos}$ is the number of examples known to be out-of-scope and $N'_{oos}$ is the number of examples predicted by the NLI model as out-of-scope.

Execution Results

Figures 7A, 7B:
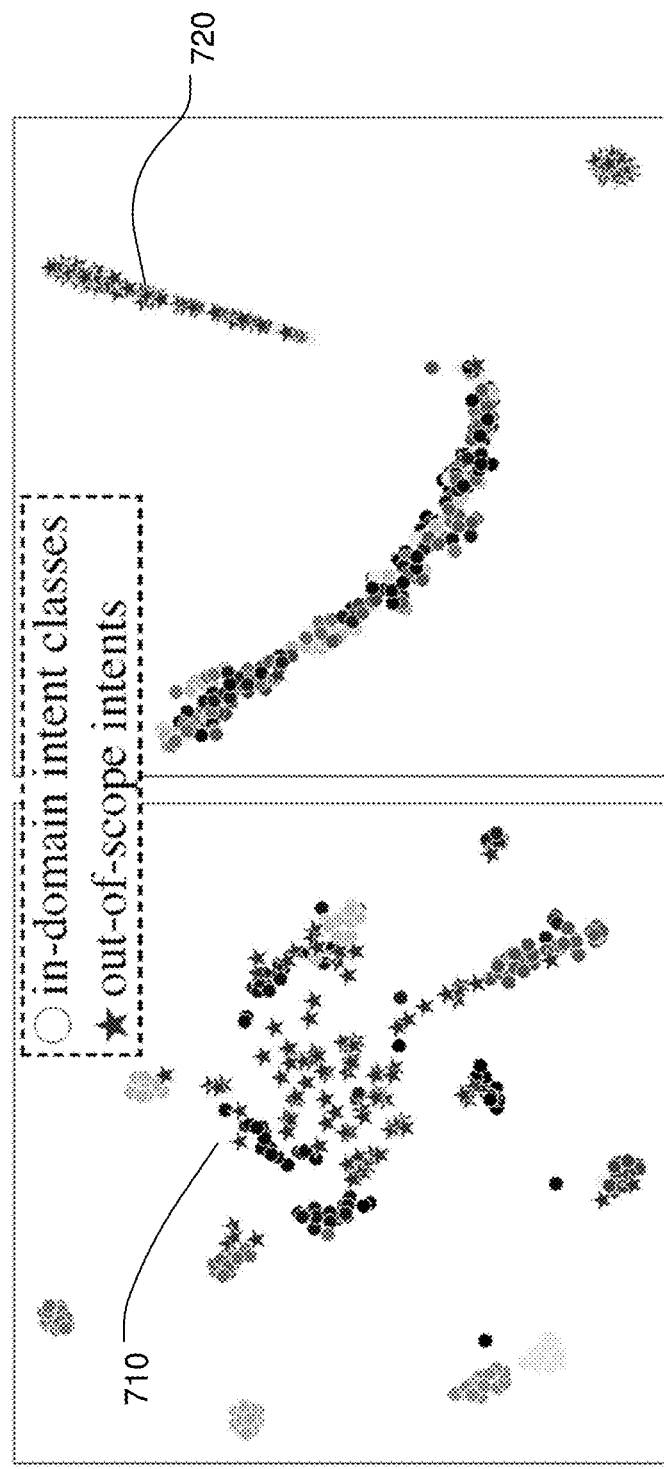
FIGS. 7A-B show charts illustrating results of execution of the NLI model showing effective handling of out-of-scope intent, according to some embodiments.

FIGS. 7A-B show charts illustrating results of execution of the NLI model showing effective handling of out-of-scope intent, according to some embodiments. FIG. 7A shows the result of classification based on a conventional process that is not based on the embodiments disclosed herein and FIG. 7B shows the results of the predictions of NLI model according to an embodiment disclosed herein. As shown in FIG. 7, the data points represented using stars are out-of-scope values. The data points 710 representing out-of-scope intent in FIG. 7A are mixed with the data points representing in-domain intent values whereas the data points 720 representing out-of-scope values in FIG. 7B are clustered separate from the in-domain intent values. Accordingly, the embodiments disclosed herein are able to clearly identify the out-of-scope intent in user expressions.

Computer Architecture

Figure 8:
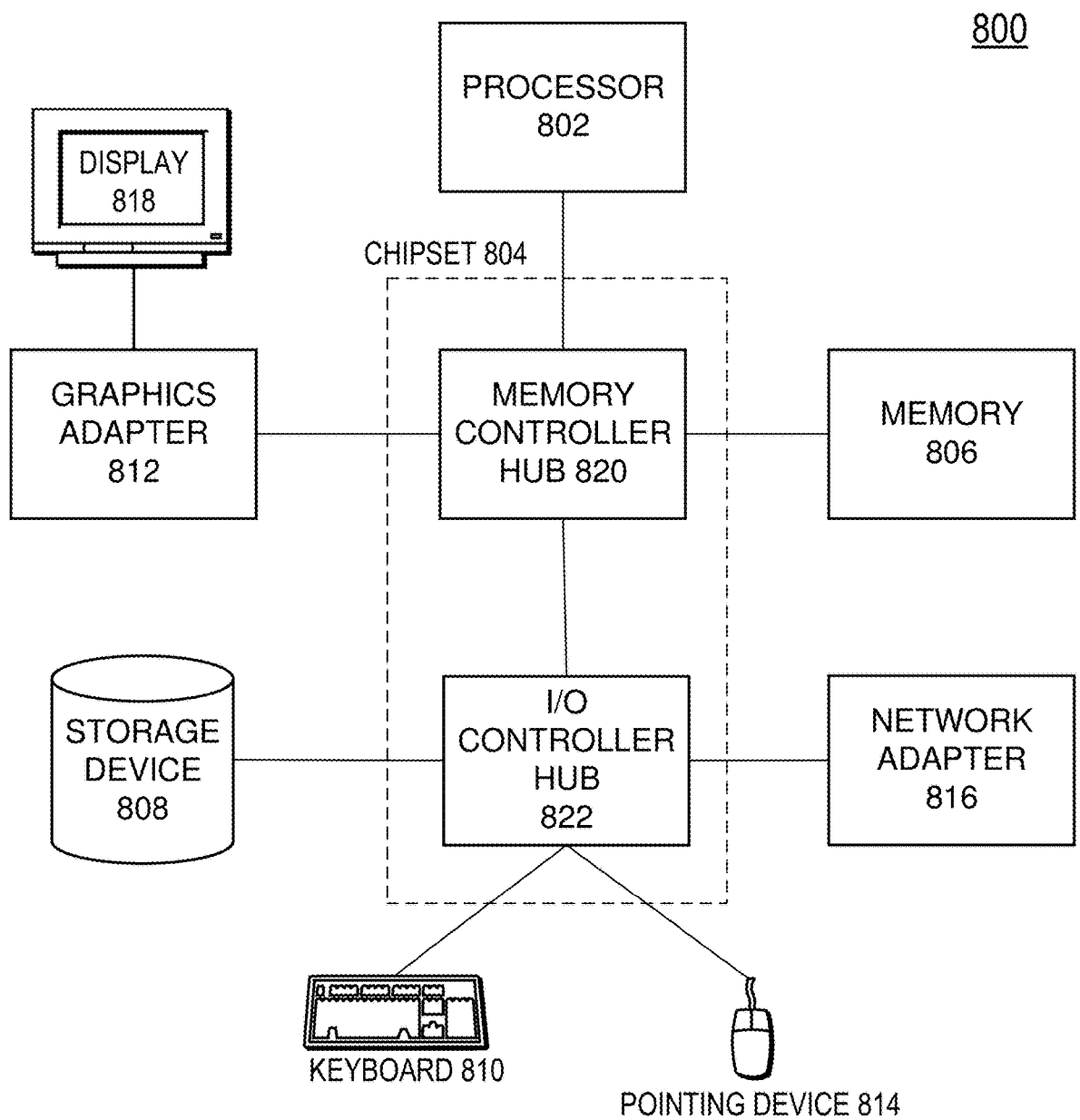
FIG. 8 is a high-level block diagram illustrating physical components of a computer used as part or all of the online system or the client devices from FIG. 1, according to one embodiment.

FIG. 8 is a high-level block diagram illustrating physical components of a computer 800 used as part or all of the online system 120 or the client devices 115 from FIG. 1, according to one embodiment. Illustrated are at least one processor 802 coupled to a chipset 804. Also coupled to the chipset 804 are a memory 806, a storage device 808, a graphics adapter 812, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 couples the computer 800 to a local or wide area network.

As is known in the art, a computer 800 can have different and/or other components than those shown in FIG. 8. In addition, the computer 800 can lack certain illustrated components. In one embodiment, a computer 800 acting as a server may lack a graphics adapter 812, and/or display 818, as well as a keyboard or pointing device. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

We claim:

1. A computer-implemented method for determining user intent for a user natural language expression through natural language inference, the computer-implemented method comprising:
    for each intent of a plurality of stored possible intents, storing a plurality of example expressions for the possible intent;
    obtaining a user expression in natural language form;
    for each possible intent of the plurality of stored possible intents, and for each example expression of the pluralities of example expressions for the possible intent:
        providing the user expression and the example expression as input to a natural language inference model (NLI), and
        obtaining from the natural language inference model a score indicating whether the user expression textually entails the example expression;
    selecting a most applicable intent from the plurality of stored possible intents based on the obtained scores;
    comparing a score of the selected most applicable intent to a confidence threshold; and
    responsive to the score of the selected most applicable intent indicating a low confidence based on the comparison, determining that the user expression has an out-of-scope intent, wherein the out-of-scope intent is distinct from the plurality of stored possible intents.

2. The computer-implemented method of claim 1, wherein the user expression is a first user expression and the score is a first score, the method, further comprising;
    obtaining a second user expression in natural language form;
    determining a second score for the second user expression using the NLI model;
    comparing the second score to the confidence threshold; and responsive to the second score exceeding the confidence threshold, thereby indicating a high confidence in the score value, assigning the most applicable intent to the user expression.

3. The computer-implemented method of claim 1, wherein determining the confidence threshold comprises:
   identifying a plurality of possible values of the confidence threshold;
   determining a joint score based on a sum of the measure of accuracy and a measure of out-of-scope recall for each possible value of the confidence threshold; and
   selecting the confidence threshold value from the plurality of possible values that maximizes the joint score for a training data set.

4. The computer-implemented method of claim 3, wherein determining the joint score for a possible value of confidence threshold comprises:
   determining the measure of accuracy of the NLI model represents a fraction of examples that are accurately predicted by the model to have one of the plurality of stored possible intents;
   determining the measure of out-of-scope recall for the NLI model based on a fraction of known out-of-scope examples that are predicted to be out-of-scope by the NLI model; and
   determining the joint score for the possible value of confidence threshold based on the measure of accuracy and the out-of-scope recall.

5. The computer-implemented method of claim 1, further comprising:
   storing encoded example expressions for possible intents, each encoded example expression generated by providing an example expression as input to the NLI model;
   generating an encoded version of the user expression by providing the user expression as input to the NLI model;
   selecting a subset of the example expressions based on a cosine similarity between the encoded example expressions and encoded user expression; and
   determining the most applicable intent from the plurality of stored possible intents using the subset of example expressions.

6. The computer-implemented method of claim 1, further comprising:
   determining that the selected most applicable intent is representative of the user expression; and
   performing an action in response to the user expression based on the selected most applicable intent, wherein the action comprises one or more of:
      accessing data in a data store,
      interacting with an external system, or
      performing a transaction.

7. The computer-implemented method of claim 1, further comprising:
   determining that the selected most applicable intent is representative of the user expression;
   labeling the user expression with the selected most applicable intent; and
   training an intent classification model by providing the labeled user expression and other labeled natural language expressions to a supervised learning algorithm.

8. The computer-implemented method of claim 1, wherein selecting a most applicable intent from the plurality of stored possible intents based on the obtained scores comprises:
   selecting the intent having the stored example expression with the highest score.

9. The computer-implemented method of claim 1, wherein selecting a most applicable intent from the plurality of stored possible intents based on the obtained scores comprises:
   computing, for each intent of the stored possible intents, an aggregate score based on the scores of the stored example expressions for the intent; and
   selecting the intent having the highest aggregate score.

10. A computer-implemented method for determining user intent for a user natural language expression through natural language inference, the computer-implemented method comprising:
   for each intent of a plurality of stored possible intents, storing a plurality of example expressions for the possible intent;
   accessing a natural language inference (NLI) model configured to receive as input a user expression and an example expression and determine a score indicating whether the expression textually entails the example expression, the NLI model further configured to generate an encoded version of the user expression;
   for each intent of a plurality of stored possible intents, for each example from the plurality of example expressions for the possible intent, generating an encoded example expression by providing the example expression as input to the NLI model;
   obtaining, from a user, a user expression in natural language form;
   generating an encoded version of the user expression by providing the user expression as input to the NLI model;
   selecting a subset of the example expressions based on a cosine similarity between the encoded example expressions and encoded user expression; and
   determining the most applicable intent from the plurality of stored possible intents using by applying the NLI model to the subset of example expressions.

11. The computer-implemented method of claim 10, wherein determining the most applicable intent from the plurality of stored possible intents comprises:
   for each example expression of the subset of example expressions:
      providing the user expression and the example expression as input to a natural language inference model, and
      obtaining from the natural language inference model a score indicating whether the user expression textually entails the example expression; and
   selecting a most applicable intent from the plurality of stored possible intents based on the obtained scores.

12. The computer-implemented method of claim 10, further comprising:
   responsive to the score corresponding to the most applicable intent being below a confidence threshold, thereby indicating a low confidence in the score value, assigning the user expression an out-of-scope intent.

13. The computer-implemented method of claim 10, further comprising:
   responsive to the score corresponding to the most applicable intent exceeding the confidence threshold, thereby indicating a high confidence in the score value assigning the user expression a stored intent selected from the plurality of stored possible intents.

14. A non-transitory computer-readable storage medium storing instructions that when executed by a computer processor, causes the computer processor to perform steps comprising:
  for each intent of a plurality of stored possible intents, storing a plurality of example expressions for the possible intent;
  obtaining a user expression in natural language form;
  for each possible intent of the plurality of stored possible intents, and for each example expression of the pluralities of example expressions for the possible intent:
    providing the user expression and the example expression as input to a natural language inference model, and
    obtaining from the natural language inference model (NLI) a score indicating whether the user expression textually entails the example expression;
  selecting a most applicable intent from the plurality of stored possible intents based on the obtained scores;
  comparing a score of the selected most applicable intent to a confidence threshold; and
  responsive to the score of the selected most applicable intent indicating a low confidence based on the comparison, determining that the user expression has an out-of-scope intent, wherein the out-of-scope intent is distinct from the plurality of stored possible intents.

15. The non-transitory computer-readable storage medium of claim 14, wherein the user expression is a first user expression and the score is a first score, wherein the instructions further cause the computer processor to perform steps comprising:
  obtaining a second user expression in natural language form;
  determining a second score for the second user expression using the NLI model;
  comparing the second score to the confidence threshold; and
  responsive to the second score exceeding the confidence threshold, thereby indicating a high confidence in the score value, assigning the most applicable intent to the user expression.

16. The non-transitory computer-readable storage medium of claim 14, wherein determining the confidence threshold comprises:
  identifying a plurality of possible values of the confidence threshold;
  determining a joint score based on a sum of the measure of accuracy and the measure of out-of-scope recall for each possible value of the confidence threshold; and
  selecting the confidence threshold value from the plurality of possible values that maximizes the joint score for a training data set.

17. The non-transitory computer-readable storage medium of claim 16, wherein determining the joint score for a possible value of confidence threshold comprises:
  determining the measure of accuracy of the NLI model based on a fraction of examples that are accurately predicted by the model to have one of the plurality of stored possible intents;
  determining the measure of out-of-scope recall for the NLI model based on a fraction of known out-of-scope examples that are predicted to be out-of-scope by the NLI model; and
  determining the joint score for the possible value of confidence threshold based on the measure of accuracy and the out-of-scope recall.

18. The non-transitory computer-readable storage medium of claim 14, wherein the instructions further cause the computer processor to perform steps further comprising:
  storing encoded example expressions for possible intents, each encoded example expression generated by providing an example expression as input to the NLI model;
  generating an encoded version of the user expression by providing the user expression as input to the NLI model;
  selecting a subset of the example expressions based on a cosine similarity between the encoded example expressions and encoded user expression; and
  determining the most applicable intent from the plurality of stored possible intents using the subset of example expressions.

19. The non-transitory computer-readable storage medium of claim 14, wherein the instructions further cause the computer processor to perform steps further comprising:
  determining that the selected most applicable intent is representative of the user expression; and
  performing an action in response to the user expression based on the selected most applicable intent, wherein the action comprises one or more of:
    accessing data in a data store,
    interacting with an external system, or
    performing a transaction.

20. The non-transitory computer-readable storage medium of claim 14, wherein selecting a most applicable intent from the plurality of stored possible intents based on the obtained scores comprises one or more of:
  selecting the intent having the stored example expression with the highest score; or
  computing, for each intent of the stored possible intents, an aggregate score based on the scores of the stored example expressions for the intent and selecting the intent having the highest aggregate score.

* * * * *